United States Patent [19]

Fluchel

[11] Patent Number: 4,540,471
[45] Date of Patent: Sep. 10, 1985

[54] SOLVENT DISTILLATION UNIT WITH ADJUSTABLE SCRAPERS

[75] Inventor: Donald G. Fluchel, St. Louis, Mo.

[73] Assignee: Progressive Recovery, Inc., St. Louis, Mo.

[21] Appl. No.: 624,145

[22] Filed: Jun. 25, 1984

[51] Int. Cl.³ ...................... B01D 21/14; B01D 21/22
[52] U.S. Cl. .................................. 202/175; 202/236; 159/6.2; 159/25.2; 196/122; 196/123
[58] Field of Search ........... 202/236, 175, 241, 267 R; 159/11.1, 11.2, 11.3, 6.1, 6.2, 25 A, 25 R; 203/89; 196/122, 123

[56] References Cited

U.S. PATENT DOCUMENTS

| | | | |
|---|---|---|---|
| 2,255,059 | 9/1941 | Houdry | 196/122 |
| 2,554,546 | 5/1951 | Zahm | 159/6.2 |
| 2,678,093 | 5/1954 | Fischer | 159/11.1 |
| 2,955,990 | 10/1960 | Smith | 202/236 |
| 3,054,729 | 9/1962 | Smith | 202/236 |
| 3,316,958 | 5/1967 | Johnston | 202/236 |
| 3,396,088 | 8/1968 | Bechard | 159/11.2 |
| 3,428,106 | 2/1969 | Johnston | 159/6.2 |
| 3,483,092 | 12/1969 | Young | 202/181 |
| 3,486,984 | 12/1969 | Sperry | 202/172 |
| 3,522,016 | 7/1970 | Groves et al. | 422/158 |
| 3,621,506 | 11/1971 | Armstrong et al. | 159/11.2 |
| 3,739,710 | 6/1973 | Costa et al. | 159/25 A |
| 4,095,307 | 6/1978 | Brubaker | 15/246.5 |

FOREIGN PATENT DOCUMENTS

| | | | |
|---|---|---|---|
| 2408969 | 11/1974 | Fed. Rep. of Germany | 159/6.2 |
| 2603480 | 4/1977 | Fed. Rep. of Germany | 159/6.1 |
| 2419094 | 11/1979 | France | 159/6.2 |

OTHER PUBLICATIONS

Renzmann, "Destillieranlage Typ Roto", West Germany, pp. 1–4.

Primary Examiner—S. Leon Bashore
Assistant Examiner—Virginia Manoharan
Attorney, Agent, or Firm—Rogers, Howell, Renner, Moore & Haferkamp

[57] ABSTRACT

A solvent reclaiming unit has a still for distillation of contaminated solvents to recover clean solvent from the solvent vapor. The still has a tapered or conical bottom heat exchange surface surrounded by a heat source. The still has scrapers which wipe the heat exchange surface to prevent scaling of the heat exchange surface. The scrapers are driven during the distillation process by an external motor and reducer. The contact of the scrapers with the heat exchange surface is adjustable from outside of the still to maintain wiping contact. The wiping portion or blades of the scrapers may be formed of brass or other soft material attached to a harder material, such as a spring stainless steel. A safety stop is provided in the interior of the vessel so that the blades may not be adjusted to the point that the harder steel comes in contact with the heat exchange surface.

19 Claims, 7 Drawing Figures

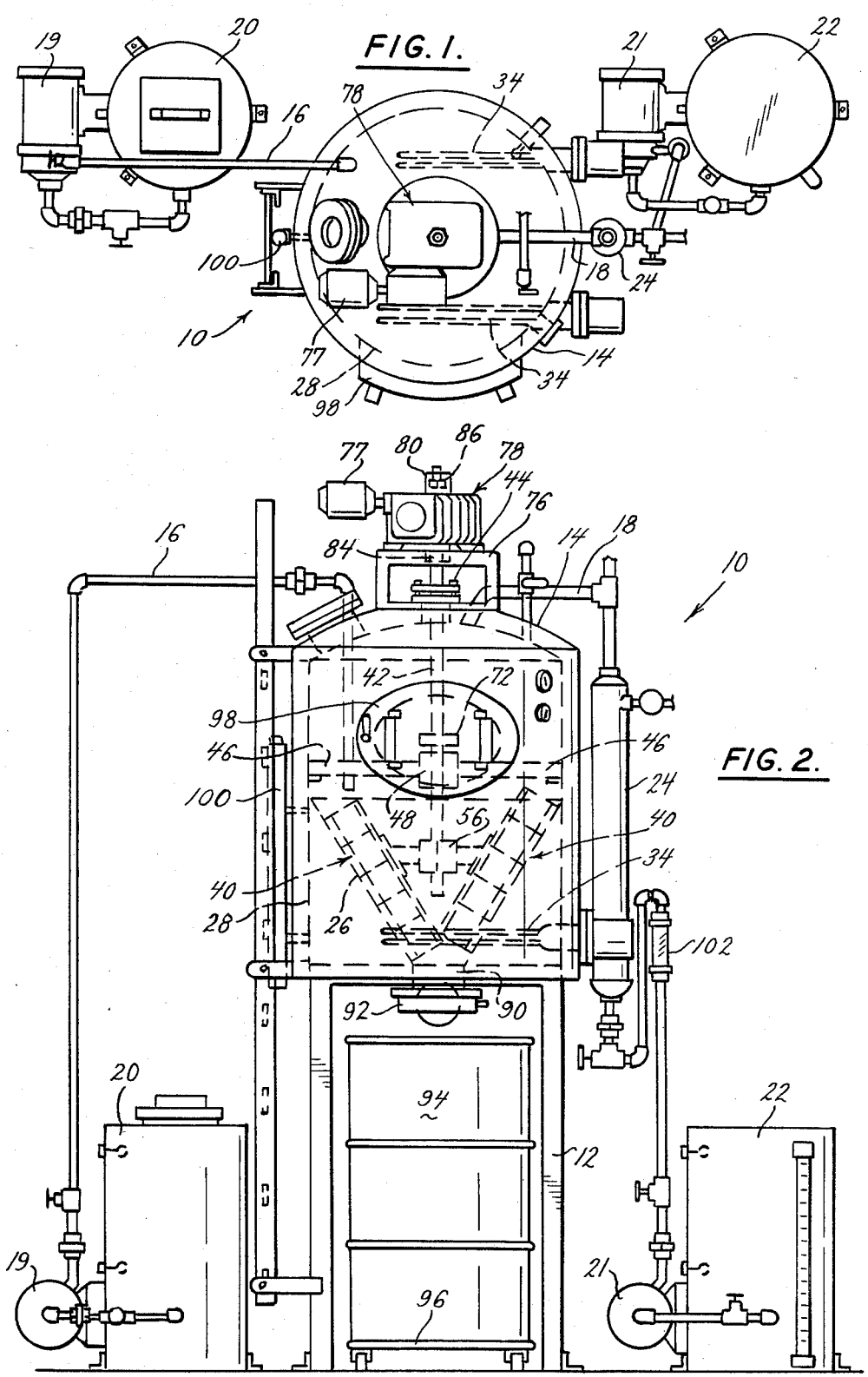

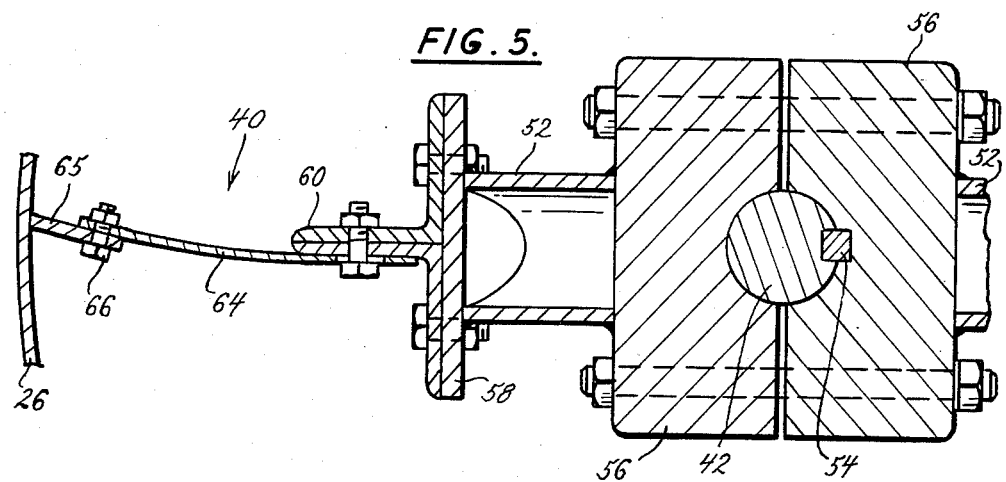
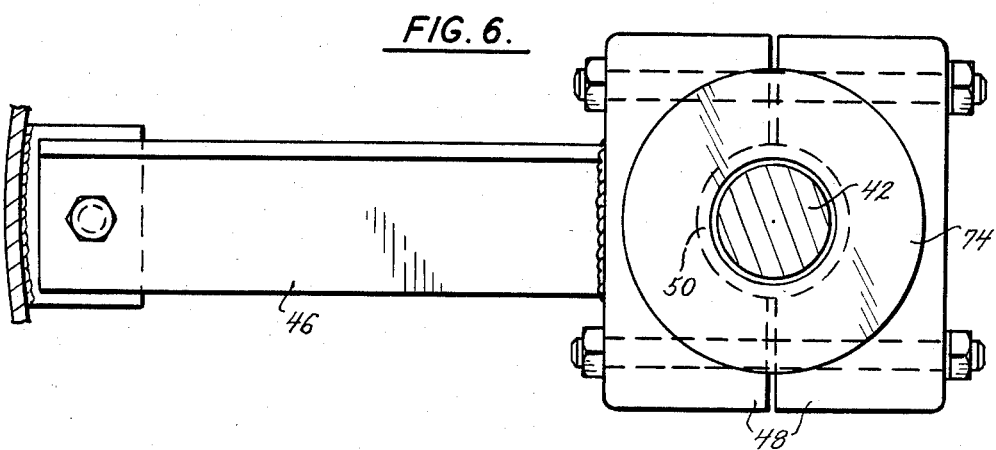
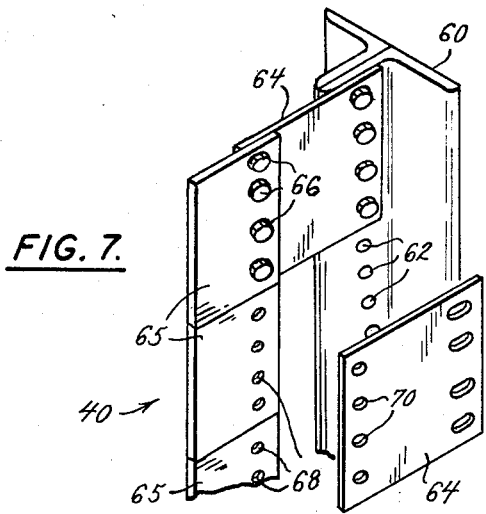

SOLVENT DISTILLATION UNIT WITH ADJUSTABLE SCRAPERS

BACKGROUND AND SUMMARY OF THE INVENTION

This invention generally relates to solvent distillation units and more particularly to such units which during operation have power driven rotating scraper blades to prevent excessive accumulation of solid buildup on the heat exchange surface.

Extremely large quantities of organic solvents are used in producing many items of commerce. The plastics, paint and varnish, and printing industries and many others all use large quantities of organic solvents, both for producing the products themselves, to clean equipment, and for other uses. Much of this solvent becomes contaminated and must be disposed of or reprocessed.

In recent years there has become greater recognition of the hazard of solvent disposal which has resulted in increased regulation and hence cost. Moreover, the disposal of solvent without reclamation is a waste of valuable and limited resources as much of it has petroleum as its source.

The overall cost of a plant's solvent requirements, including the cost of disposal, is significantly reduced by the use of solvent distillation units which may be located and operated at the plant where the solvents are used. In accordance with such known distillation units, the unit may have a cylindrical tank with a conical bottom section. Within the tank are rotating scraper blades which scrape against the internal wall of the conical section as well as the lower portion of the side wall of the cylinder. Typically, the scraper blades are mounted on a vertical shaft that extends down the center of the tank and is rotated by a motor driven power unit externally at the top of the tank. A heat exchange surface surrounds the lower part of the tank including the conical section for purposes of heating the solvent within the tank. Means are provided for supplying contaminated solvent into the tank, and for the removal of solvent vapors to a condensor and reservoir for the reclaimed solvent. Also typically, the scraper blades of known units are segmented to accommodate for any unevenness in the surfaces over which they scrape as they rotate, and the blades themselves are of a relatively soft material, such as brass, compared to that of the tank which may be stainless steel. In addition to the distillation unit just described, other prior art of general interest is shown by U.S. Pat. Nos. 2,255,059, 3,428,106, 3,486,984, 3,522,016, and 4,095,307.

The purpose for the scraper blades of these known prior art distillation units is to prevent excessive buildup of solid waste materials on the internal walls of the vessel where the heat exchange is located and which would act as an insulator to substantially reduce the efficiency of the unit. Much of the used solvent material is so heavily contaminated that during the distillation process the solids quickly scale the heat exchange surfaces. Thus, the scrapers are operated continuously during the distillation process to prevent the buildup of scale and maintain the efficiency of the unit.

One of the problems with known units is in adjusting the scraper blades so that they maintain sufficient contact with the heat exchange surface to keep it free of excessive scale. The solid waste material in the solvent can be quite abrasive which causes the relatively soft material of the scraper blades to quickly wear. As the blades wear the build-up of scale on the heat exchange surface becomes greater until the efficiency of the unit is reduced to where blade adjustment is required. With known units this has been accomplished by adjusting the blades internally of the vessel. This means that a worker in the plant had to reach inside the vessel to adjust each one of the blades. Because these solvents are so toxic, the unit had to be cleaned before the blades could be adjusted. The task of cleaning the unit and adjusting the blades was very time-consuming and distasteful. Down times of two and three days were not uncommon.

Applicant has solved this problem in providing a solvent distillation unit where the scraper blades can be adjusted externally of the vessel, and without requiring the unit to be entirely shut down and cleaned. The adjustment can be made in a few minutes without requiring access into the inside of the vessel. More specifically, in accordance with the present invention the scraper blades rotate to scrape the internal surface of the conical bottom of the vessel. The scraper blades are mounted on a vertical shaft which is powered by a motor drive externally at the top of the vessel. Adjustment of the scraper blades outwardly against the conical surface is accomplished through vertical adjustment of the shaft externally at the top of the vessel where the motor drive is located. As a result, the present invention provides a distillation unit which maintains efficient heat exchange for economical reclamation of waste solvent materials and minimizes the expensive down time that had been required to adjust the scrapers. The invention further provides means for preventing overadjustment of the scraper and consequent damage to the heat exchange surface and hazard that exists by explosion should the harder metal of the blade holder scrape the vessel wall.

These and further objects and advantages of the invention are apparent from the drawings and detailed description to follow.

DESCRIPTION OF THE DRAWINGS

FIG. 1 is a top plan view of applicants' distillation still;

FIG. 2 is a side view of the device shown in FIG. 1;

FIG. 5 is a partial cross-sectional view taken along the plane of line 5—5 in FIG. 3;

FIG. 6 is a partial cross-sectional view taken along the plane of line 6—6 in FIG. 3; and FIG. 7 is a partial prospective view showing a typical blade holder and blade used with the still of the present invention.

DESCRIPTION OF THE PREFERRED EMBODIMENT

Figure 4:
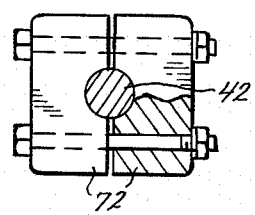
FIG. 4 is a cross-sectional view taken along the plane of line 4—4 in FIG. 3.

Referring in more detail to the drawings, the solvent reclaiming unit 10 includes a frame 12 on which is mounted a distillation still 14. Still 14 is provided with inlet 16 and exit 18, as shown in FIG. 2. Inlet 16 provides a supply of dirty solvent to the still 14 via pump 19 from reservoir 20. Outlet 18 removes solvent vapors from still 14 and transmits them via pump 21 to a reservoir 22 for clean solvent. A condensor 24 is interposed in exit 18 to cool the clean solvent vapors and condense them to a liquid form.

Figure 3:
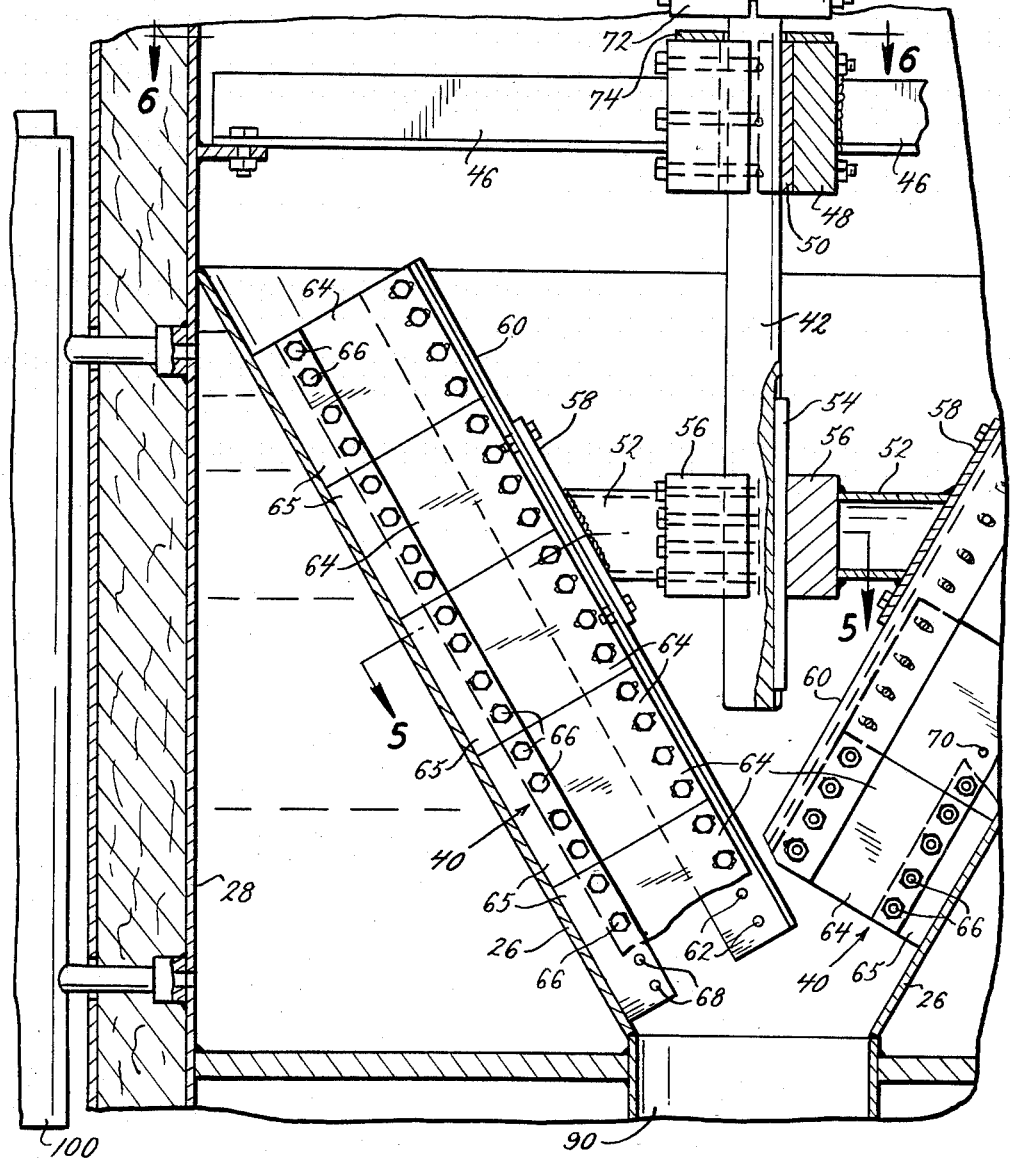
FIG. 3 is a partial cross-section of the device shown in FIG. 2 with portions broken away.

Still 14 is provided with a false bottom and heat exchange surface 26, as shown in FIG. 3. Bottom 26 is conical, for reasons described further herein, and is surrounded by a heating jacket 28. Heating jacket 28 may be supplied with heat from a variety of sources such as a heat transfer fluid. The heat transfer fluid may be provided from an external source or heated in place using electric heating element 34 as shown in FIG. 2. The thermal fluid can be any conventional type such as a thermal oil or a commercial heat transfer fluid, such as Dowtherm TM. Heat can also be supplied to the heating jacket via steam. It will be appreciated that a variety of equivalent heat sources can be used.

The distillation still can be provided with fluid level control devices, either automatic or manual, to maintain a relatively uniform level of contaminated solvent in the vessel during operation.

The interior of still 14 is provided with a set of wall-contacting scrapers 40, as shown in FIG. 3. Scrapers 40 are driven by a central rotating shaft 42 which enters the still 14 through a packed stuffing box 44, as shown. An internal support 46 in the interior of still 14 supports a bearing block 48 and a bearing 50 which supports shaft 42 in the interior of vessel 14. Scrapers 40 are mounted on arms 52 which are mounted on shaft 42 by key 54 and split mounting blocks 56, as shown. Scrapers 40 are mounted to arms 52 by a pair of angled plates 58 which may be welded or joined by other means to arms 52. Plates 58 support blade holders 60 formed of T-members, for example made by joining two pieces of structural angle to form a "T" as shown. Blade holders 60 may be perforated at a variety of locations 62 along their length to provide mounting means for scrapers 40 attached by bolts 63.

Each scraper 40 typically is formed of a plurality of resilient sections 64, for example formed of spring stainless steel, and a corresponding plurality of blades 65. Blades 65 typically are formed of a softer metal, such as brass. The softer material will not damage the bottom 26 of vessel 14, but is effective to prevent accumulation of scale and residue on the heat exchange surface. Scraper blades 65 and spring sections 64 are joined, for example, by bolts 66 through matching perforations 68, 70 in blades 65 and spring sections 64.

In the interior of still 14 the shaft 42 is provided with a collar 72 above bearing 50. Bearing 50 has a thrust plate 74. Collar 72 is spaced above thrust plate 74 a distance slightly less than the maximum vertically downward adjustment of the blades to be allowed.

On the top of still 14 is a motor frame 76 which mounts and supports motor 77 and reducer assembly 78. Scraper shaft 42 passes upwardly through motor frame 76 and connects with reducer assembly 78. Reducer assembly 78 has a hollow shaft 80 through which scraper shaft 42 passes. Reducer assembly 78 is of a conventional design, such as CONE DRIVE TM model OVS made by the Ex-Cell-O Corporation. Scraper shaft 42 is rotatably fixed to reducer shaft 80, for example by keys or splines, not shown. Upper portion 82 of shaft 42 is threaded. The vertical position of scraper shaft 42 in hollow shaft 80 of reducer assembly 78 is adjusted by a pair of nuts 84, 86 threaded on scraper shaft 42, as shown in FIGS. 2 and 3. Nuts 84 and 86 may have associated washers such as washer 88 shown in FIG. 3.

Still 14 also has a sludge exit 90 in the bottom of the still, and a dump valve 92. Frame 12 of still 14 is of sufficient height that a sludge barrel 94 on a dolly 96 may be placed under the still 14 to receive sludge from the still at the end of its distillation cycle. Still 14 also has a manhole 98 to allow access to the interior of still 14. It will be appreciated that the still 14 may be used in conjunction with various sight glasses 100, flow meters 102, flow controllers, pumps and auxiliary equipment, as understood by one skilled in the art.

OPERATION

The scraper blades 40 are initially adjusted to be preloaded with the spring sections 64 curved as shown in FIG. 5 so that the blades apply sufficient force against the heat exchange wall to prevent the accumulation of excessive scale. The solvent recovery unit 10 operates by introducing contaminated solvent through entrance line 16 into the interior of still 14. If desired, the solvent can be preheated to just below the boiling point by an external heat source, not shown. Heat is supplied to the heating jacket 28. Motor 77 is activated to rotate scrapers 40 attached to rotating shaft 42. The applied heat raises the temperature of the solvent to above the boiling point and the vapors are recovered through exit line 18. The recovered solvent passes through condensor 24 which cools the solvent vapors causing them to condense to the liquid phase. The recovered solvent is conducted into storage reservoir 22. As the solvent volume in still 14 is reduced by being vaporized and removed through exit line 18, additional solvent is added through entrance line 16 to maintain the solvent level in still 14 at a height approximate that of the top of heating jacket 28.

As the recovered solvent vapors are continuously removed from the still 14, the solids content of the contaminated solvent in the bottom of still 14 increases. Rotation of shaft 42 and scraper assemblies 40 by motor 77 and reducer 78, move blades 65 over the conical heat exchange surface 26 with the blades in scraping contact therewith to prevent excessive accumulation of solids or scale on the heat exchange surface. The multi-segmented blades and spring sections 65, 64 allow a very intimate contact between the blades 65 and surface 26 since a localized irregularity in the surface 26 or tenacious bit of scale will only push one segment of the scraper out of contact at that point. The remaining segments of scraper are allowed to remain in continuous contact with surface 26. When the solids content of the solvent in the bottom of still 14 renders the solvent charge too viscous, distillation can be completed by going into a cook down cycle. The resultant sludge can be removed through exit port 90 and dump valve 92. The conical shape of false bottom 26 facilitates removal of this high solids content waste material. The sludge can be received by a storage barrel 94, as shown in FIG. 2, which can serve as a vehicle for storage of the removed contaminates. It will be appreciated that the volume of the contaminated material will be considerably less than that of the initial contaminated solvent and that significant economic return can be realized by recycling the clean solvent to other uses.

As previously noted, the scraper blades 65 are of a relatively soft material compared to the material of the conical bottom 26 so that minimal wear occurs in surface 26. Typically bottom 26 is of stainless steel and scraper blades 65 may be brass. After an extended period of use, scraper blades 65 will wear to such an extent that they no longer remain in scraping contact with the surface 26 and are not effective to prevent scaling. The present invention provides easy readjustment to be made in the contact between scraper blades 65 and surface 26 to restore scraping contact with minimal down time. The adjustment does not require access to the interior of the vessel, and can normally be made while distillation continues. The adjustment is made by loosening upper nut 86, connecting shaft 42 to reducer 78, and by tightening lower nut 84. As lower nut 84 is tightened, the shaft 42 and scrapers 40 are forced downwardly, which, because of the conical shape of the bottom 26 and corresponding angle of the blades 65, forces the blades 65 into contact with the surface 26. By indexing the shaft and scrapers as nut 84 is tightened, the blades and spring sections are preloaded as shown in FIG. 5 without jamming or buckling the blades and springs. The nut 86 is then retightened, and rotation of the shaft 42 and scrapers 40 is resumed.

After a considerable time of operation of the scrapers 40, the blades 65 will become worn to the point that further adjustment would place the hard steel spring sections 64 in contact with surface 26. Operation of the scrapers 40 in this condition could damage surface 26 and might create sparks which could lead to an explosion. Contact between surface 26 and spring sections 64 is prevented by collar 72 on shaft 42. Collar 72 is placed so that it will impinge upon plate 74 of bearing assembly 48, 50 before spring sections 64 are brought into contact with surface 26, the collar acting as a stop to prevent further adjustment. When this condition is reached, the operation of the still 14 can be shut down and new scraper blades 65 installed through manhole 98.

While the foregoing specific embodiments of the invention have been set forth in considerable detail for purposes of making a complete disclosure of the invention, it will be apparent to those skilled in the art that numerous changes may be made in such details without departing from the spirit and principles of the invention. The invention is to be limited only by the claims appended hereto and the equivalents thereof.

I claim:

1. A solvent distillation unit comprising a vessel into which contaminated solvent is introduced, said vessel having a heat exchange surface for heating said solvent, scraper means internally of said vessel for preventing excessive accumulation of solids on the internal surface of said heat exchange surface during distillation, drive means for operating said scraper means to scrape said heat exchange surface during distillation, and means for adjusting externally of the vessel the contact between the scraper means and the heat exchange surface without the need for access inside the vessel.

2. The unit of claim 1 wherein the scraper means includes replaceable means to contact the heat exchange surface, the replaceable means being of a softer material than the heat exchange surface.

3. The unit of claim 1 further comprising safety means limiting adjustment of said scraper means.

4. The unit of claim 1 wherein at least a portion of said heat exchange surface is substantially conical, said scraper means having blades angled to conform to said conical surface, a vertical drive shaft extending downwardly through the top of the vessel, and means for mounting said blades to said drive shaft for rotation about a vertical axis.

5. The unit of claim 4 wherein said external adjusting means further comprises means externally of said vessel for vertically adjusting said drive shaft to thereby vertically adjust said scraper blades and adjust their contact with said heat exchange surface.

6. The unit of claim 5 wherein said drive means further comprises a motor, a reducer having a hollow vertical shaft externally of said vessel at the top thereof, said drive shaft extending through said hollow shaft, means locking said hollow shaft and drive shaft in rotational engagement and allowing vertical adjustment of said drive shaft relative to said hollow shaft, and means for securing said drive shaft in selected vertical adjustment.

7. The unit of claim 6 wherein said drive shaft is threaded where it extends through said hollow shaft, and further comprising locking nuts threadingly engaged on said drive shaft at the ends of said hollow shaft to secure the drive shaft in selected vertical adjustment.

8. The unit of claim 5 further comprising bearing means within said vessel for supporting said drive shaft for rotation, said bearing means allowing vertical adjustment of said drive shaft.

9. The unit of claim 8 further comprising stop means limiting the downward vertical adjustment of said drive shaft.

10. The unit of claim 9 wherein said stop means further comprises a collar on said drive shaft above said bearing means within the vessel, said collar engaging said bearing means upon maximum downward adjustment of said drive shaft to prevent further downward adjustment thereof.

11. The unit of claim 4 wherein said scraper means further comprises blades that scrape the heat exchange surface, said blades being of a softer material than that of the heat exchange surface, and further comprising spring sections to which said blades are mounted and which bias the blades against said surface.

12. The unit of claim 11 wherein said blades and spring sections are segmented, and said blades are secured to said spring sections and adapted for replacement of said blades.

13. A solvent distillation unit comprising a vessel into which contaminated solvent is introduced, said vessel having a heat exchange surface for heating said solvent, at least a portion of said surface at the bottom of said vessel being conical, scraper means internally of said vessel for preventing excessive accumulation of solids on the internal surface of said conical heat exchange surface during distillation, said scraper means having blades conforming to the conical surface, a vertical drive shaft extending downwardly through the top of the vessel, means for mounting said blades to said drive shaft for rotation about a vertical axis, drive means for rotatably driving said shaft to rotate said scraper blades during distillation, and means for vertically adjusting said shaft externally of said vesel to thereby adjust the contact of said scraper blades with said conical heat exchange surface without the need for access inside the vessel.

14. The unit of claim 13 wherein said drive means further comprises a rotatably driven hollow shaft at the top of said vessel and externally thereof, said drive shaft extending through said hollow shaft, means locking said hollow shaft and drive shaft in rotational engagement and allowing vertical adjustment of said drive shaft relative to said hollow shaft, and means for securing said drive shaft in selected vertical adjustment.

15. The unit of claim 13 further comprising means connecting said drive means to said drive shaft for rotation of said drive shaft, said connecting means having means externally of said vessel for providing vertical adjustment of said drive shaft.

16. The unit of claim 13 wherein said blades are of a softer material than that of the heat exchange surface, and said scraper means further comprises spring sections to which said blades are mounted and which bias the blades against said surface.

17. The unit of claim 16 wherein said blades and spring sections are segmented.

18. A solvent distillation unit comprising a vessel into which contaminated solvent is introduced, said vessel having a heat exchange surface for heating said solvent, at least a portion of said surface at the bottom of said vessel being conical, scraper means internally of said vessel for preventing excessive accumulation of solids on the internal surface of said conical heat exchange surface during distillation, said scraper means having blades conforming to the conical surface, a vertical drive shaft, means for mounting said blades to said drive shaft for rotation about a vertical axis, drive means for rotatably driving said shaft to rotate said scraper blades during distillation, and means for vertically adjusting said shaft externally of said vessel to thereby adjust the contact of said scraper blades with said conical heat exchange surface without the need for access inside the vessel.

19. The unit of claim 18 wherein said drive means further comprises a rotatably driven hollow shaft, said drive shaft extending through the hollow shaft, means locking said hollow shaft and drive shaft in rotational engagement and allowing vertical adjustment of said drive shaft relative to said hollow shaft, and means for securing said drive shaft in selected vertical adjustment.

* * * * *